United States Patent
Kumagai

(10) Patent No.: US 8,083,886 B2
(45) Date of Patent: Dec. 27, 2011

(54) METHOD OF PRODUCING OPTICAL FILM LAMINATES

(75) Inventor: Daisuke Kumagai, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 383 days.

(21) Appl. No.: 12/511,472

(22) Filed: Jul. 29, 2009

(65) Prior Publication Data

US 2010/0024972 A1    Feb. 4, 2010

(30) Foreign Application Priority Data

Jul. 30, 2008    (JP) .................................. 2008-196564

(51) Int. Cl.
B32B 37/00        (2006.01)
B32B 38/00        (2006.01)
(52) U.S. Cl. ...................... 156/265; 156/270; 156/302
(58) Field of Classification Search .................. 156/265, 156/270, 302
See application file for complete search history.

(56) References Cited

U.S. PATENT DOCUMENTS

| | | | | |
|---|---|---|---|---|
| 5,888,603 A | * | 3/1999 | Fergason | 428/46 |
| 2009/0033851 A1 | * | 2/2009 | Saitoh | 349/119 |
| 2009/0068472 A1 | * | 3/2009 | Umemoto et al. | 428/411.1 |
| 2010/0314032 A1 | * | 12/2010 | Kumagai et al. | 156/192 |

* cited by examiner

*Primary Examiner* — Linda L Gray
(74) *Attorney, Agent, or Firm* — Westerman, Hattori, Daniels & Adrian, LLP

(57) ABSTRACT

An object of the present invention is to simplify the production steps and achieve efficient use of optical film webs in a case of producing an optical film laminate having three or more layers of optical films laminated together. A method of producing optical film laminates by cutting a laminate into a desired shape includes: cutting a first optical film web into first cut pieces along first cut lines; laminating the first cut pieces onto a second optical film web to form a laminate film; cutting the laminate film into second cut pieces along second cut lines; and laminating the second cut pieces onto a third optical film web. An angle of the first cut lines is determined to have the first cut lines crossing the optical axis of the first optical film web at a predetermined angle, and an interval of the first cut lines is determined to have the width of the second optical film web substantially equal to the width of the first cut pieces. An angle of the second cut lines relative to the second optical film web is determined to have the second cut lines crossing the optical axis of the second optical film web at a predetermined angle, and an interval of the second cut lines is determined to have the width of the third optical film web substantially equal to the width of the second cut pieces.

4 Claims, 5 Drawing Sheets

METHOD OF PRODUCING OPTICAL FILM LAMINATES

CROSS REFERENCE TO RELATED APPLICATION

This application claims priority from Japanese Patent Application No. 2008-196564, which is incorporated herein by reference.

BACKGROUND OF THE INVENTION

1. Field of the Invention

The present invention relates to a method of producing optical film laminates. More particularly, the present invention relates to a method of producing optical film laminates that each include three or more optical films, such as a polarizing film and an optical compensation film, which are laminated to each other.

2. Description of the Related Art

In recent years, not only polarizing films but also various kinds of optical film, such as retardation films and brightness enhancement films are frequently used in the form of a laminate of three or more layers thereof for a liquid crystal display device. Even for an image display device other than a liquid crystal display device, plural optical films are sometimes used in the form of a laminate of three or more layers thereof.

An optical film laminate having three or more layers of such optical films laminated together are produced by forming three or more optical films, such as polarizing film and an optical compensation film independently of each other, bonding them together and cutting a laminate intermediate into a predetermined size and a predetermined shape. One of characteristic features of an optical film laminate lies in that each optical film has an optical orientation axis. When this optical film laminate is formed, the respective layers must be laminated to each other to allow the optical orientation axis of each optical film to define a predetermined angle.

Hitherto, investigation has been carried out on a method of producing optical film laminates by laminating three or more layers of optical films, as shown in FIG. 5. Specifically, the method includes cutting out rectangular film pieces 111, 112, 113 from first to third optical film webs 101, 102, 103 respectively at predetermined angles, bonding these rectangular film pieces 111, 112, 113 together, cutting a thus obtained laminate intermediate 104 into small pieces having a predetermined shape (e.g., rectangular shape) to provide product chips 105. This method will be also hereinafter referred as a single plate bonding method.

According to the single plate bonding method, product chips 105 can be produced from substantially the entire area of the laminate intermediate 104 having the film pieces 111, 112, 113 laminated together, provided that these film pieces cut out from the first to third optical film webs have a uniform shape. Thus, the single plate bonding method is advantageous in that even three or more layer of optical films can be laminated to each other by remarkably simple steps.

SUMMARY OF THE INVENTION

However, the single plate bonding method is on the other hand disadvantageous in the fact that, when the film pieces 111, 112, 113 have been cut out from the first to third optical film webs, a large number of cut fragments 114 which cannot be processed into products are caused in the optical film webs 101, 102, 103, which poses a problem of causing inefficient use of each optical film web.

The present invention has been conceived in consideration of the above problems associated with the conventional techniques. It is an object of the present invention to simplify the production steps as much as possible and at the same time achieve efficient use of optical film webs in a case of producing an optical film laminate having three or more layers of optical films laminated together to allow the optical orientation axis of each optical film to define a predetermined angle.

According to the present invention, there is provided a method of producing optical film laminates as products by cutting a laminate that has at least a first optical film, a second optical film and a third optical film laminated to each other, into a desired shape, comprising:

a first cutting step of successively cutting a first optical film web having an optical orientation axis into first cut pieces along first cut lines;

a first laminating step of laminating the first cut pieces successively onto a second optical film web having an optical orientation axis to form a laminate film;

a second cutting step of successively cutting the laminate film into second cut pieces along second cut lines; and a second laminating step of laminating the second cut pieces successively onto a third optical film web having an optical orientation axis; wherein an angle of the first cut lines relative to the first optical film web is determined to have the first cut lines crossing the optical orientation axis of the first optical film web at a predetermined angle in the first cutting step, and an interval of the first cut lines is determined to have the width of the second optical film web substantially equal to the width of the first cut pieces when the first cut pieces are disposed on the second optical film web to have the first cut lines oriented in parallel with the longitudinal direction of the second optical film web in the first laminating step; and wherein an angle of the second cut lines relative to the second optical film web is determined to have the second cut lines crossing the optical orientation axis of the second optical film web at a predetermined angle, and an interval of the second cut lines is determined to have the width of the third optical film web substantially equal to the width of the second cut pieces when the second cut pieces are disposed on the third optical film web to have the second cut lines oriented in parallel with the longitudinal direction of the third optical film web in the second laminating step.

The term "web" is herein meant a long thin and flexible material, which is generally processed by moving over rollers, and is stored and transported as rolls also known as coils.

According to the method of producing optical film laminates of the present invention, since the interval of the first cut lines is determined to allow the first cut pieces, which are cut out in the first cutting step, to have a width substantially equal to the width of the second optical film web when they are laminated to the second optical film, the entire area of the first optical film web can be used as a laminate. In addition, since the interval of the second cut lines is determined to allow the second cut pieces, which are cut out in the second cutting step, to have a width substantially equal to the width of the third optical film web when they are laminated to the third optical film web, the entire area of the second optical film and the entire area of the first optical film web (first cut pieces) laminated onto the second optical film can be used to prepare a laminate. With this method, when the laminate having the first to third optical films laminated to each other is subsequently cut into pieces having a desirable product shape, product chips can be cut out from the entire area of the laminate except peripheral portions of seams of the first optical film (first cut pieces) and peripheral portions of seams of the second optical film (second cut pieces).

According to the present invention, there is provided a method of producing the optical film laminate, in which the third optical film web is cut along third cut lines, which extend along seams of the adjacent second cut pieces (i.e., boundaries of the second optical film web) bonded to the third optical film web, to prepare laminate intermediates, and the laminate intermediates are cut into product shapes.

Since the third optical film web is cut along the third cut lines, which extend along seams of the adjacent second cut pieces (i.e., boundaries of the second optical film web) to prepare laminate intermediates, the third cut lines and the seams of the second cut pieces (i.e., boundaries of the second optical film web) are matched in position with each other. Therefore, when laminate intermediates are prepared, it is possible to prevent lowering of yield due to the cutting along the third cut lines.

In the present invention, the expressions, the "first", the "second" and the "third" used when referring to any substances are intended to merely distinguish plural substances from each other, and therefore not intended to give any specific meanings, such as the order in arrangement and the quantity.

As described above, with the method of producing optical film laminates of the present invention, it is possible to simplify production steps because the number of film pieces directly cut out from an optical film web is reduced. In addition, each optical film web can be more efficiently used and thus the production efficiency as a whole can be greatly improved.

As the number of film pieces directly cut out from an optical film web is decreased, the size of each film piece is necessarily increased. Whereby, angular orientation of the film pieces when they are bonded can be made with higher precision. Thus, it is possible to produce an advantageous effect in which optical film laminates can be produced with higher precision.

DESCRIPTION OF THE PREFERRED EMBODIMENTS

Figure 1:
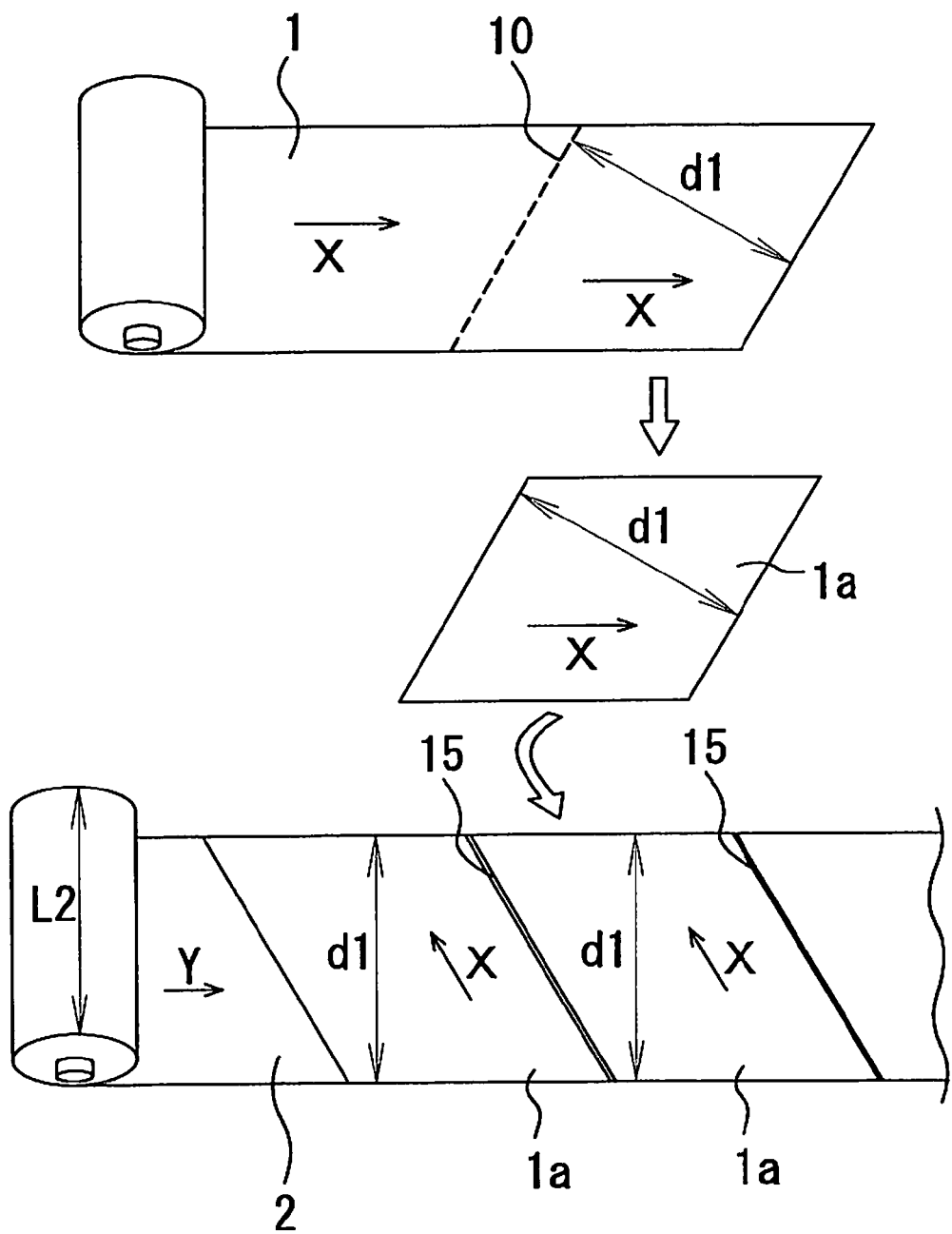
FIG. 1 is a conceptual diagram showing a first cutting step of cutting a first optical film web 1 into first cut pieces, and a first laminating step of laminating the first cut pieces onto a second optical film web 2 in a method of producing optical film laminates according to one embodiment of the present invention.
Figure 2:
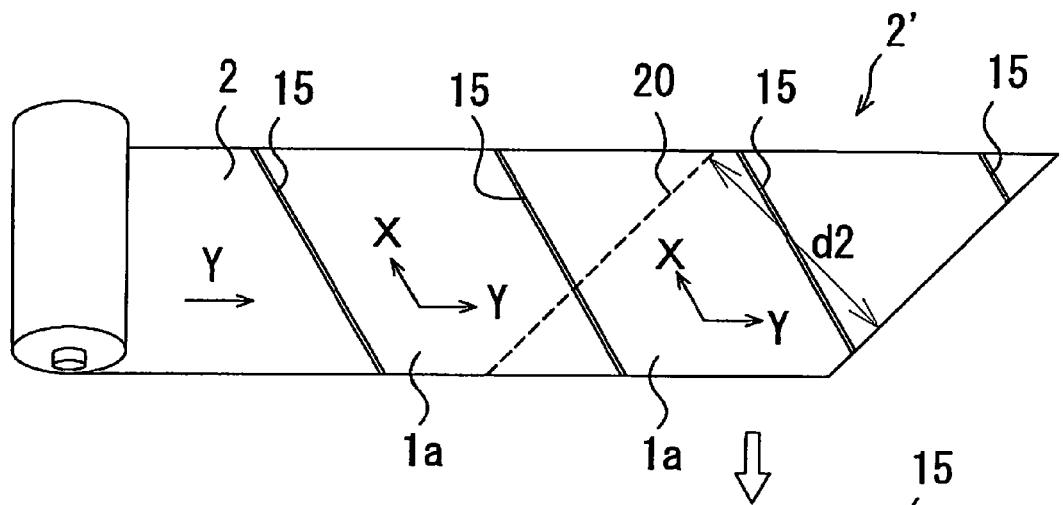
FIG. 2 is a conceptual diagram showing a second cutting step of cutting the second optical film web 2 having the first cut pieces 1 laminated thereon into a second cut piece, and a second laminating step of laminating the second cut pieces onto a third optical film web 3 in a method of producing optical film laminates according to one embodiment of the present invention.
Figure 2:
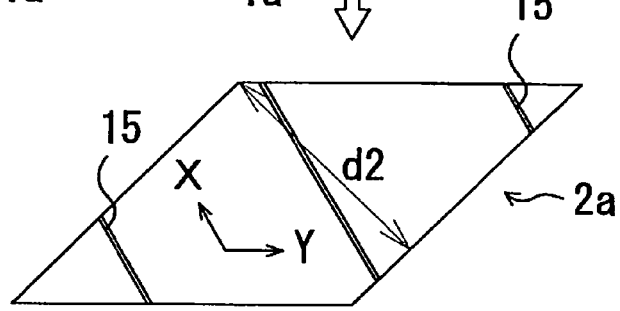
Figure 2:
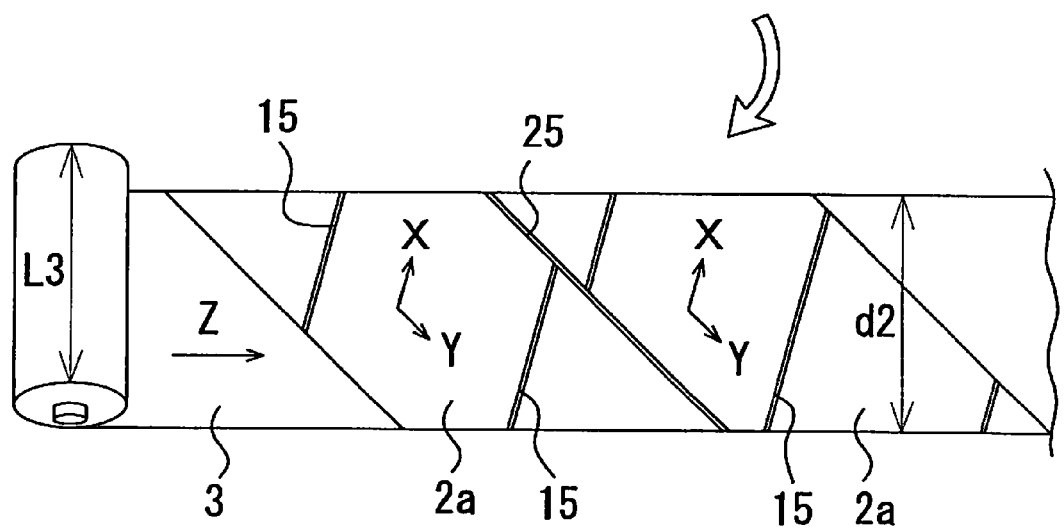
Figure 3:
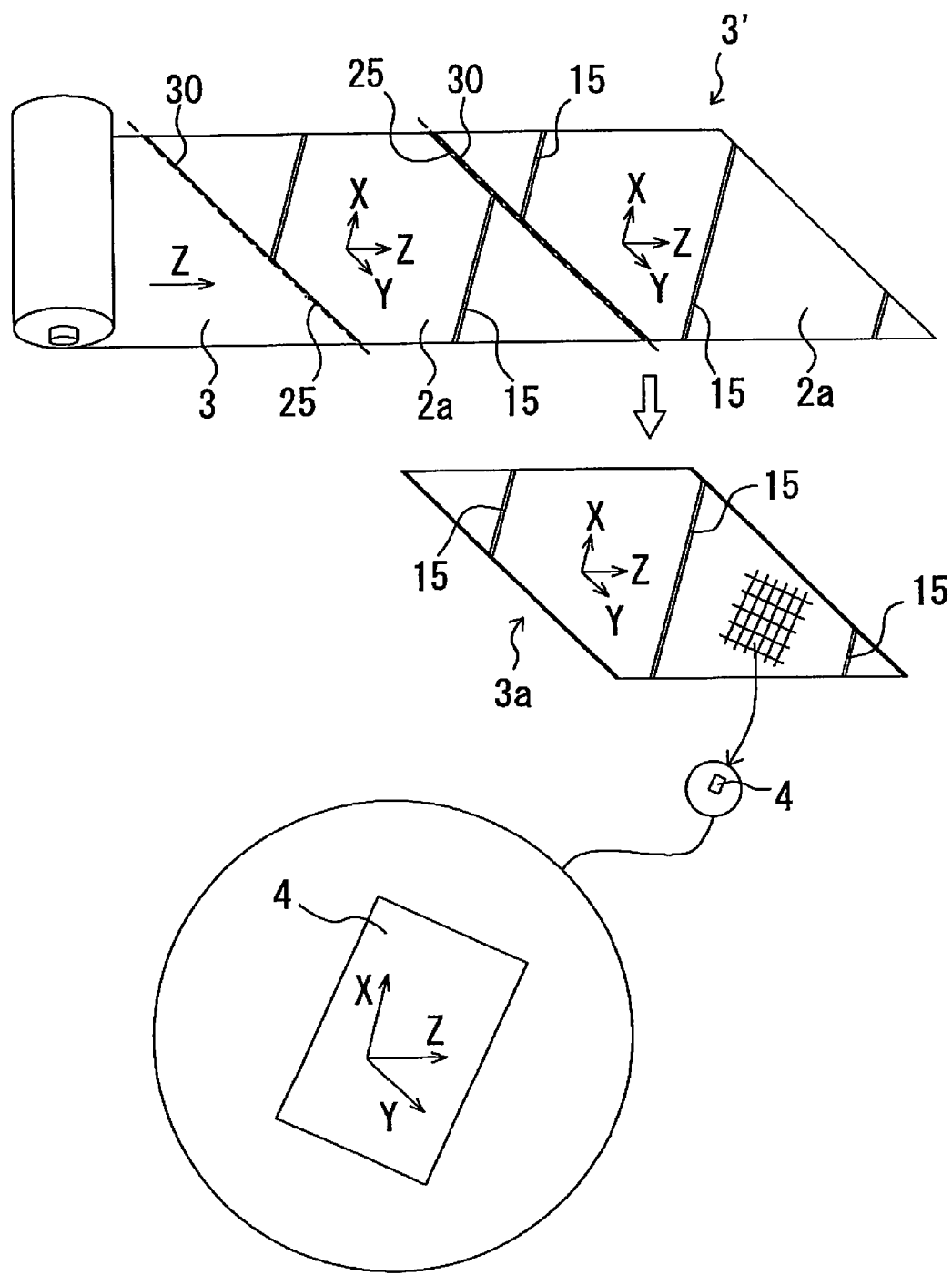
FIG. 3 is a conceptual diagram showing a third cutting step of cutting the third optical film web 3 having the second cut pieces laminated thereon into third cut pieces in a method of producing optical film laminates according to one embodiment of the present invention.

FIGS. 1 to 3 are conceptual diagrams showing the respective steps in the order of production according to one embodiment of a method of producing optical film laminates of the present invention. As shown in FIGS. 1 to 3, the description will be made for the method of producing optical film laminates of this embodiment by taking, for example, a case in which optical film laminates 4 as products are produced by laminating a first optical film web 1 having an optical orientation axis X, a second optical film web 2 having an optical orientation axis Y, a third optical film web 3 having an optical orientation axis Z to each other.

The first to third optical film webs may be various optical films, provided that they each have an optical orientation axis. Examples of the optical films include a polarizing film, a retardation film and a brightness enhancement film. An optical film effectively usable for a liquid crystal display device can be produced by appropriately selecting these optical films.

The examples of the combination of those optical films include a combination of a polarizing film, a retardation film and a brightness enhancement film, and a combination of a polarizing film, a retardation film and a retardation film.

A retardation film is herein meant a film that is capable of producing a phase difference when light passes therethrough. Specifically, the refractive index in-plane of this film is different so as to allow the phase of transmitted light to be advanced in a direction in which the refractive index is minimum and to be retarded in a direction in which the refractive index is maximum. In other words, the slow axis of a retardation film is meant a direction in which the phase of light transmitting the film is retarded, that is, a direction in which the refractive index becomes maximum in the film in-plane. That is, the slow axis of a retardation film is one of examples as an optical orientation axis in the present invention.

Specifically, the retardation film can be obtained by stretching a polymer film. For example, the retardation film can be obtained by applying tension onto an unstretched film at an appropriate temperature and increasing the molecular orientation along the stretching direction. An example of a polymer film includes a film which is produced by forming into a film shape at least one polymer material selected from the group consisting of acetate resin, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixture of a thermoplastic resin whose side chain has a substituted or unsubstituted imide group and a thermoplastic resin whose side chain has a substituted or unsubstituted phenyl group and a nitrile group, and a liquid crystal polymer. Examples of a film forming method include a casting method from solution and an extrusion molding method.

A polarizing film is herein meant a film that is capable of transmitting linearly polarized light when natural light is made incident on the polarizing film. Specifically, a polarizing film is designed to transmit one of polarizing elements of light made incident orthogonally, while block the other by absorption (or reflection or scattering). Specifically, the absorption axis of the polarizing film represents a direction in which the polarized elements are absorbed, and is one of the examples as an optical orientation axis in the present invention.

Examples of the polarizing film to be used in the present invention include a film produced by, for example, dyeing and absorbing a substrate film of, for example, polyvinyl alcohol with a dichroic material, such as iodine and organic dyestuffs, and then stretching the film. Generally, the direction in which the film has been stretched becomes the absorption axis.

A brightness enhancement film is herein meant a film that has characteristics, in which, among lights incident from a light source such as a backlight of a liquid crystal display device, etc., linearly polarized light with a predetermined polarization axis, or circularly polarized light with a predetermined direction is transmitted, while other light is not transmitted therethrough but is reflected. That is, a brightness enhancement film is to allow light from a light source such as a backlight to be incident into the brightness enhancement film to obtain a transmitted light in a predetermined polarized state, allow light other than the light in the predetermined polarized state not to transmit through the brightness enhancement film and therefore to be reflected, thereby allowing the reflected light to be reversed via a reflecting layer or the like provided on the back side of the brightness enhancement film to be incident into the brightness enhancement film again to increase the amount of light transmitted through the brightness enhancement film, while supply polarized light, which is not easy to be absorbed by a polarizer, thereby to increase the amount of light usable for a liquid crystal display device or the like and hence improve the brightness. An example of optical orientation axis in the brightness enhancement film includes a polarizing direction of transmitted light.

In this embodiment, as shown in FIG. 1, a first optical film web 1 having an optical orientation axis X is successively cut along first cut lines 10 to thereby carry out a first cutting step for forming first cut pieces 1a having a parallelogram shape. By the parallelogram shape is herein meant to include a rectangular shape as one form of the parallelogram shape.

The angle of the first cut line 10 relative to the longitudinal direction of the first optical film is determined in view of the angle between the orientation axes X and Y required in an optical film laminate 4 as a product.

An interval d1 between the adjacent first cut lines 10, 10 is determined in view of a film width L2 of a second optical film 2 to which the first cut pieces 1a are laminated, and is set to allow d1 and L2 to be matched with each other in this embodiment.

As shown in FIG. 1, the first cut pieces 1a each are rotated to have the orientation axis X crossing the orientation axis Y at a predetermined angle, and then laminated onto the second optical film web 2, thereby carrying out a first laminating step. By the first laminating step, the first cut pieces 1a are laminated onto the second optical film 2 to be disposed adjacent to each other via seams 15. Specifically, the first cut pieces 1a are disposed so as not to make non-laminated portions cut at the time when the film is cut at least along second cut lines 20.

Figure 4:
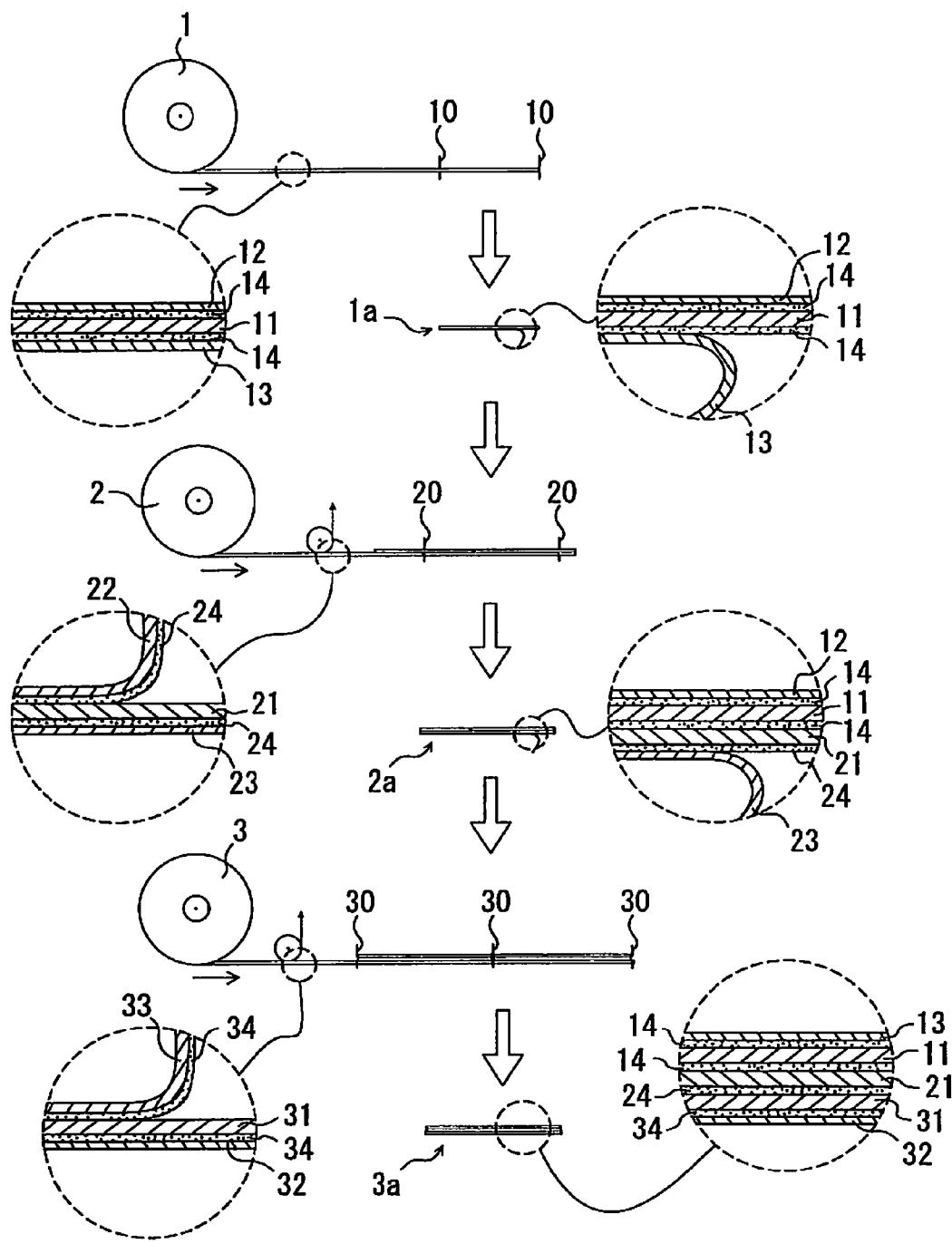
FIG. 4 is a cross sectional view showing a laminate structure of each optical film and each cut piece in a method of producing optical film laminates according to one embodiment of the present invention.
Figure 5:
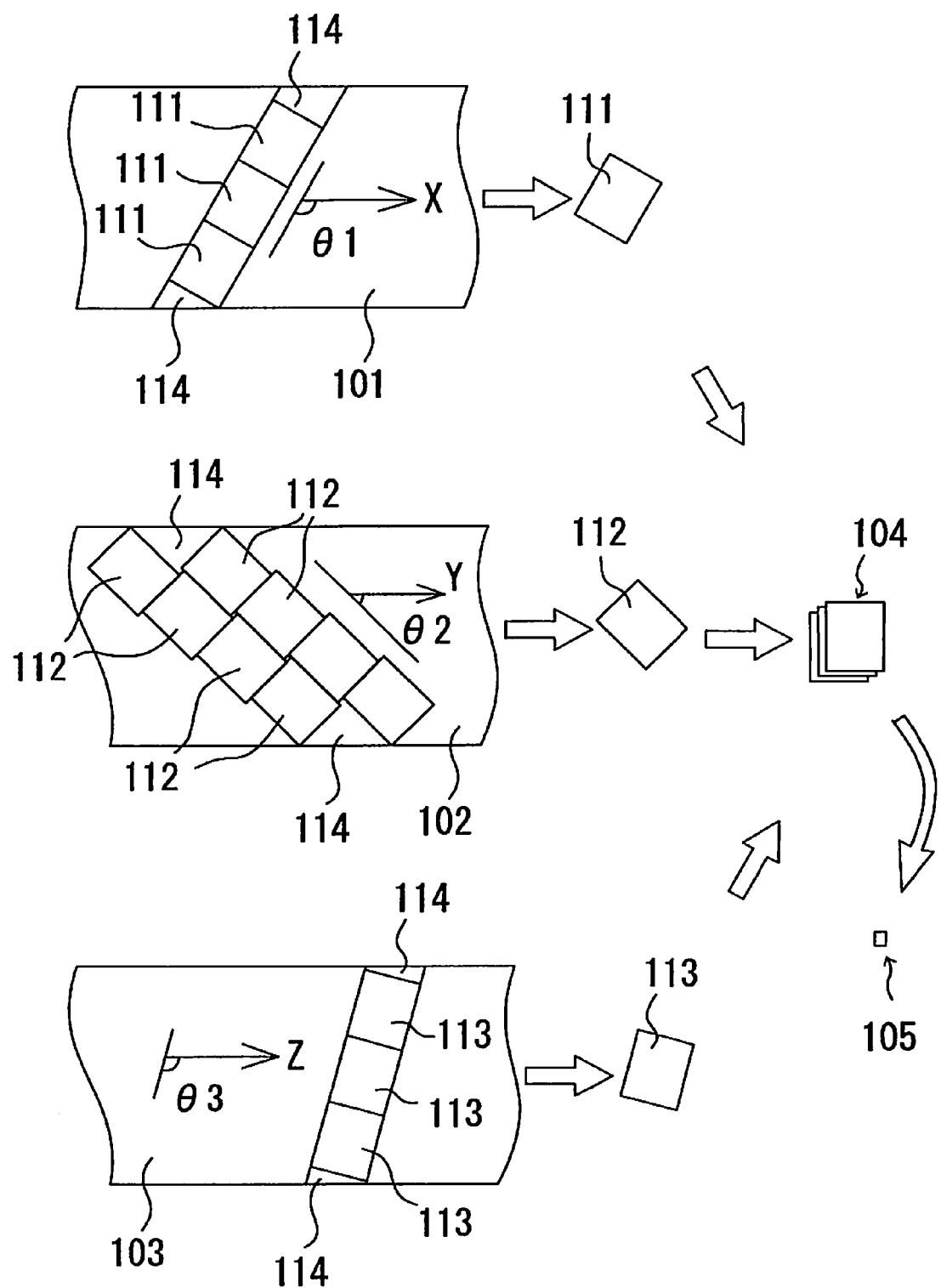
FIG. 5 is a conceptual diagram showing a conventional single plate bonding method.

In a case where each first cut piece 1a is to be laminated onto the second optical film web 2, both are generally laminated onto each other via an adhesive layer. In this embodiment, as shown in FIG. 4, the first optical film web 1 is constituted by including a first optical film body 11, adhesive layers 14, 14 and releasing material layers 12, 13 respectively laminated on both the front and back sides of the first optical film body 11. The second optical film web 2 is also constituted by including a second optical film body 21, adhesive layers 24, 24 and releasing material layers 22, 23 respectively laminated on both the front and back sides of the second optical film body 21. The adhesive layer 14 on the back side is exposed to the outside by removing the releasing material layer 22 from the back side of the first cut piece 1a, which has been cut out. On the other hand, the second optical film body 21 is exposed to the outside by removing the releasing material layer 22 along with the adhesive layer 24 from the front side of the second optical film web 2, and the first cut piece 1a is laminated onto the second optical film body 21 by means of the adhesive layer 14.

Then, as shown in FIG. 2, a laminate film 2' made up of the first optical film web 1 (first cut piece 1a) and the second optical film web 2, which have been obtained by the first laminating step, is cut along second cut lines 20 to form second cut pieces 2a each having a parallelogram shape, thereby carrying out a second cutting step for forming second cut pieces 2a each having a parallelogram shape.

The angle of the second cut line 20 relative to the longitudinal direction of the second optical film web 2 is determined in view of the angles defined by the orientation axes X and Y relative to the orientation axis Z, which are required in an optical film laminate 4 as a product.

An interval d2 between the adjacent second cut lines 20, 20 is determined in view of a film width L3 of a third optical film web to which second cut pieces 2a are bonded, and is set to allow d2 and L3 to be matched with each other in this embodiment.

As shown in FIG. 2, the second cut pieces 2a each are rotated to have the orientation axes X and Y crossing the orientation axis Z at a predetermined angle, and laminating them onto the third optical film web 3, thereby carrying out a second laminating step. By the second lamination step, the second cut pieces 2a are successively laminated onto the third optical film 3 to be disposed adjacent to each other via seams 25. Specifically, the second cut pieces 2a are disposed so as not to make non-laminated portions cut at the time when the film is cut at least along third cut lines 30 which will be hereinafter described.

When the second cut pieces 2a each are laminated onto the third optical film web 3, they are laminated each other via the adhesive layer 24 laminated onto the back side of the second optical film 2 in this embodiment, as shown in FIG. 4. Specifically, the second optical film 2 is constituted by including adhesive layers 24, 24 and releasing material layers 22 and 23 respectively laminated on both the front and back sides of the second film body 21. The third optical film 3 is also constituted by including adhesive layers 34, 34 and releasing material layers 32, 33 respectively laminated on both the front and back sides of the third film body 31. The adhesive layer 24 on the back side is exposed to the outside by removing the releasing material layer 23 from the back side of the second cut piece 2a, which has been cut out, while the third optical film body 31 is exposed to the outside by removing the releasing material layer 33 along with the adhesive layer 34 from the front side of the third optical film web 3, and the second cut piece 2a is laminated onto the third optical film web 3 by means of the adhesive layer 24.

As shown in FIG. 3, a laminate film 3' made up of a laminate (second cut piece 2a) of the first optical film web 1 and the second optical film web 2 obtained by the second laminating step, and the third optical film 3 is cut along third cut lines 30 to form third cut pieces 3a each having a parallelogram shape, thereby carrying out a third cutting step.

The angle of the third cut line 30 relative to the longitudinal direction of the third optical film web 3 is not needed to be determined in view of the relationship with the optical characteristics of an optical film laminate 4 as a product, unlike the first cut line 10 and the second cut line 20. Therefore, the third cut line 30 can be determined without consideration of the optical characteristics of the optical film laminate 4.

However, from the view point that the optical film laminates (product chips) 4 are to be cut out from each third cut piece 3a obtained after cutting along the third cut lines 30 as effectively as possible without causing useless portions, it is preferable to determine the position of the third cut lines 30 in order to prevent reduction of an area which can be served as a product, or an area on which the first to third optical films are laminated to each other without seams.

In this embodiment, production with high yield can be realized by setting the third cut lines 30 to be matched in position with the seams 25 of the adjacent second cut pieces 2a disposed on the third optical film web 3, or providing the third cut pieces 3a of the same shape as that of the second cut pieces 2a.

The thus obtained third cut pieces 3a each are subjected to a chip cutting step, in which they are each cut into small pieces of product chips having a desirable shape (e.g., a rectangular shape). Thus, optical film laminates as products (product chips) 4 can be produced.

According to the method of producing optical film laminates of this embodiment, as shown in FIGS. 3 and 4, among the first optical film body 11, the second optical film body 21 and the third optical film body 31 of the third cut piece 3a, only the first optical film body 11 has seams, and the second optical film body 21 and the third optical film body 31 do not have seams.

Accordingly, in the chip cutting step, only the seams 15 of the first optical film 11 and the four sides of the third cut piece 3a decrease production yield, and all the other areas can be used for production of product chips.

According to a method of producing optical film laminates of this embodiment, the releasing material layer 13 is removed from the back side of the first cut piece 1a when the first cut piece 1a is to be bonded to the second optical film web 2, while the releasing material layer 13 is an integral shape covering seamlessly the entire area of the first cut piece 1a. Furthermore, the releasing material layer 23 is removed from the back side of the second cut piece 2a when the second cut piece 2a is to be bonded to the third optical film 3, while the releasing material layer 23 also has an integral shape covering seamlessly the entire area of the second cut piece 2a.

Accordingly, there is an advantage in which the bonding operations of the cut pieces can be remarkably simplified in the first laminating step and the second laminating step.

Comparing the method of the present invention with a method other than the present invention, for example, a method (hereinafter referred as a comparative method) which employs alternative cut lines matched with the seams 15, in place of the cut lines 20, that is, employs a step of cutting out second cut pieces each having the same shape as that of first cut pieces, and a step of laminating the second cut pieces onto a third optical film web, the method of the present invention is significantly distinguishable from the comparative method in terms of simultaneous achievement of high yielding and high operability.

That is, according to such a comparative method, since cut lines of the second cut pieces 2a are determined not to cut the first cut pieces 1a disposed on the second optical film web 2, it gives such an impression as if product chips can be efficiently produced. However, when the second cut pieces 2a cut along such cut lines are disposed on the third optical film web 3, they are not aligned into a band-like shape as that of the third optical film web 3. This poses a problem of deteriorating the yield due to generation of a large number of non-laminated films. Also, another problem associated with these comparative methods is that the operability may be deteriorated in a case where the second cut pieces 2a each are further cut to prevent occurrence of non-laminated portion aiming at improvement in yielding in these comparative methods.

On the contrary, this embodiment produces an advantageous effect of improving simultaneously both the yield and the operability, as described above.

As another advantageous effect produced by a method of producing optical film laminates of the present invention, it is possible to produce an optical film laminate with high accuracy whose amount of displacement of the optical axis is small. The description on this point will be made by taking a specific example. When assuming that a displacement of 2 mm takes place at a leading end of a film piece in bonding of the film, the axial displacement angle is about 1.15 degrees for a film piece having a side length of 100 mm, about 0.57 degrees for a film piece having a side length of 200 mm, and about 0.11 degrees for a film piece having a side length of 1000 mm. That is, as the side length of a film to be treated increases, the axial displacement angle decreases. In this respect, according to the present invention, the first cut pieces 1a and the second cut pieces 2a each have a side length equal to or greater than the width (generally, 1 m or greater) of an optical film web fed in the form of a raw roll. In addition, unlike the aforesaid comparative methods which require cutting of non-laminated portion and bonding of small film pieces, it is possible to produce optical film laminates with high accuracy that cause less amount of displacement of an optical axis as compared with the conventional methods.

Accordingly, in the present invention, when cutting out the first cut pieces and the second cut pieces, it is preferable to cut them to each have a parallelogram shape (including a rectangular shape) to have a length of any side being 800 mm or greater.

The above embodiment was described by taking, for example, a case in which optical film, which enable the optical orientation axes X, Y and Z of the first to third optical film webs to be oriented in parallel with the longitudinal direction of these film webs are employed. However, the present invention is not necessarily limited to this, and films in which one or more of these axes are oriented orthogonal to the longitudinal direction of the film webs may be employed.

The above embodiment produces an advantageous effect of reducing an excessive portion caused around an end portion of each optical film and thus greatly improving the efficient use of a film by making the interval d1 of the first cut lines 10 match the width L2 of the second optical film web 2, and making the interval d2 of the second cut lines 20 match the width L3 of the third optical film 3. However, the present invention is not necessarily limited to the case in which all of these dimensions are matched to each other, and therefore it is possible to determine each of the above dimensions to have a margin for error of about 5 to 10% relative to the width of each film web.

The above embodiment was described by taking, for example, a case in which a polarizing film, a retardation film and a brightness enhancement film are used as optical films. However, the optical film of the present invention is not necessarily limited to these polarizing film, retardation films and the like, while it is possible to employ any films having an optical orientation axis.

As an optical film of the present invention, it is possible to use an optical film in the form of a laminate of any of the aforesaid films each having the optical orientation axis and another film having no optical orientation axis laminated to each other.

The angle defined by the first cut line and the second cut line, or the angles defined by the first to third optical films are also not necessarily limited to specific angles. These angles may be appropriately set according to the direction of each of the optical orientation axes of each optical film, and the optical characteristics to be met in an optical film laminate as a product.

The above embodiment was described by taking, for example, a case in which a third cut piece is produced by cutting a third optical film web. However, the present invention is not necessarily limited to this embodiment, and alternatively, product chips may be directly cut out from the third optical film web, instead of cutting out the third cut piece from the third optical film web.

The above embodiment was described by taking, for example, a case in which an optical film laminate made up of three optical films laminated to each other is produced. However, the present invention is not necessarily limited to this, while the present invention may be applied to a case in which an optical film laminate made up of four or more optical films laminated to each other is produced by providing an additional step of laminating a different optical film.

In the aforesaid embodiment, the second optical film body is exposed to the outside and the first cut pieces are laminated onto the second optical film body via an adhesive layer in the first laminating step of laminating the first cut pieces onto the second optical film web. However, on the contrary, both may be laminated to each other via an adhesive layer laminated onto the second optical film web by having the first optical film body of the first cut piece exposed to the outside.

In the present invention, a means for lamination and integration of optical films is not necessarily limited to a specific means. For example, any method, such as a method which uses adhesive or tacky agent may be arbitrarily employed.

EXAMPLES

For the case (Example 1) where optical film laminates (product chips) are produced by the method described in the aforesaid embodiment, the case (Comparative example 2) where optical film laminates (product chips) are produced by the comparative method as described above and the case (Comparative example 2) where optical film laminates (product chips) are produced by a single plate bonding method, the area yield was calculated. The results are shown in Table 1.

The width of a raw roll of each optical film web used, the angle of an optical orientation axis of a product and a size or dimension of an optical film laminate (product chip) produced were set as follows:

First optical film: 1180 mm in width, 120 degrees of angle of optical orientation axis Second optical film: 1150 mm in width, 45 degrees of angle of optical orientation axis Third optical film: 1150 mm in width, 105 degrees of angle of optical orientation axis Product chip: 25.4 mm in width, 37.4 mm in length

TABLE 1

| | | | Area yield (%) | |
|---|---|---|---|---|
| | First optical film | Second optical film | Third optical film | Average |
| Example 1 | 93.9 | 93.5 | 86.0 | 91.1 |
| Comparative example 1 | 85.3 | 85.0 | 78.3 | 82.8 |
| Comparative example 2 | 73.5 | 84.0 | 76.0 | 77.8 |

As shown in Table 1, it is found that the area yield of Example 1 of the present invention has been remarkably improved as compared with the methods of Comparative examples 1 and 2.

Also, according to Example 1 of the present invention, a number of cut pieces to be treated in laminating optical films can be significantly reduced as compared with the other methods, and therefore excellent operability can be achieved.

This specification is by no means intended to restrict the present invention to the preferred embodiments set forth therein. Various modifications to the method of producing optical film laminates, as described herein, may be made by those skilled in the art without departing from the spirit and scope of the present invention as defined in the appended claims.

What is claimed is:

1. A method of producing optical film laminates as products by cutting a laminate that has at least a first optical film, a second optical film and a third optical film laminated to each other, into a desired shape, comprising:
    a first cutting step of cutting a first optical film web having an optical orientation axis into first cut pieces along first cut lines;
    a first laminating step of laminating the first cut pieces onto a second optical film web having an optical orientation axis to form a laminate film;
    a second cutting step of cutting the laminate film into second cut pieces along second cut lines; and
    a second laminating step of laminating the second cut pieces onto a third optical film web having an optical orientation axis; wherein
    an angle of the first cut lines relative to the first optical film web is determined to have the first cut lines crossing the optical orientation axis of the first optical film web at a predetermined angle in the first cutting step, and an interval of the first cut lines is determined to have the width of the second optical film web substantially equal to the width of the first cut pieces when the first cut pieces are disposed on the second optical film web to have the first cut lines oriented in parallel with the longitudinal direction of the second optical film web in the first laminating step; and wherein
    an angle of the second cut lines relative to the second optical film web is determined to have the second cut lines crossing the optical orientation axis of the second optical film web at a predetermined angle, and an interval of the second cut lines is determined to have the width of the third optical film web substantially equal to the width of the second cut pieces when the second cut pieces are disposed on the third optical film web to have the second cut lines oriented in parallel with the longitudinal direction of the third optical film web in the second laminating step.

2. The method of producing optical film laminates according to claim 1, wherein the third optical film web is cut along third cut lines, which extend along joint lines of the adjacent second cut pieces bonded to the third optical film web, to prepare laminate intermediates, and the laminate intermediates are cut into product shapes.

3. The method of producing optical film laminates according to claim 1, wherein the optical film is any one of a polarizing film, a retardation film and a brightness enhancement film.

4. The method of producing optical film laminates according to claim 2, wherein the optical film is any one of a polarizing film, a retardation film and a brightness enhancement film.

* * * * *